United States Patent
Nojiri et al.

(10) Patent No.: US 7,967,182 B2
(45) Date of Patent: Jun. 28, 2011

(54) DISSIMILAR METAL JOINT PRODUCT AND JOINING METHOD THEREFOR

(75) Inventors: Makoto Nojiri, Fukui (JP); Koichi Tomita, Fukui (JP)

(73) Assignee: Fukui Prefectural Government, Fukui (JP)

( * ) Notice: Subject to any disclaimer, the term of this patent is extended or adjusted under 35 U.S.C. 154(b) by 0 days.

(21) Appl. No.: 12/593,480

(22) PCT Filed: Mar. 28, 2008

(86) PCT No.: PCT/JP2008/056032
§ 371 (c)(1),
(2), (4) Date: Sep. 28, 2009

(87) PCT Pub. No.: WO2008/123402
PCT Pub. Date: Oct. 16, 2008

(65) Prior Publication Data
US 2010/0119870 A1  May 13, 2010

(30) Foreign Application Priority Data

Mar. 29, 2007 (JP) .................................. 2007-089176
Mar. 27, 2008 (JP) .................................. 2008-083874

(51) Int. Cl.
*B23K 20/12* (2006.01)
(52) U.S. Cl. .................. 228/112.1; 228/114.5; 428/544; 428/660
(58) Field of Classification Search .......................... None
See application file for complete search history.

(56) References Cited

U.S. PATENT DOCUMENTS

| 3,473,214 | A | * | 10/1969 | Hollander ...................... 228/113 |
| 3,685,391 | A | * | 8/1972 | Gapp et al. ...................... 411/70 |
| 5,354,623 | A | * | 10/1994 | Hall .............................. 428/610 |
| 5,368,661 | A | * | 11/1994 | Nakamura et al. ............. 148/512 |
| 5,517,956 | A | | 5/1996 | Jette et al. |
| 2005/0207896 | A1 | * | 9/2005 | Gigliotti et al. ........... 416/241 R |
| 2005/0227105 | A1 | * | 10/2005 | Jiang et al. .................... 428/660 |
| 2007/0244414 | A1 | * | 10/2007 | Reynolds et al. ............. 600/585 |
| 2008/0161728 | A1 | * | 7/2008 | Mishima ....................... 600/585 |
| 2010/0078123 | A1 | * | 4/2010 | Huang et al. ............. 156/244.23 |
| 2011/0008626 | A1 | * | 1/2011 | Huang et al. .................. 428/422 |

FOREIGN PATENT DOCUMENTS

| DE | 2559129 A | * | 7/1977 |
| JP | 59-61584 A | | 4/1984 |
| JP | 02-160187 A | | 6/1990 |
| JP | 02-160188 A | | 6/1990 |
| JP | 06-322413 A | | 11/1994 |

(Continued)

*Primary Examiner* — Kiley Stoner
(74) *Attorney, Agent, or Firm* — Sughrue Mion, PLLC

(57) ABSTRACT

Provided is a dissimilar metal joint product of nickel-titanium alloy material and pure titanium material, having a tensile strength at the joint not less than that of the pure titanium material before joining, having a small variation in the strength at the joint, and having narrow heat-affected zone after joining, and a method for joining thereof. A round rod 1 of the nickel-titanium alloy material is integrally joined with a round rod 2 of the pure titanium material, while rotating at least one of the joining faces for conducting frictional pressure welding, applying a specified upset force thereto to compress thereof, after the start of deceleration of the rotation, in a period where peripheral velocity in the outermost periphery of the rotation in the joining face is not less than 0.5 m/sec. A reaction layer structure is formed at the joint by the compressive force induced by the upset force and by the rotational force of decelerating rotation.

12 Claims, 5 Drawing Sheets

FOREIGN PATENT DOCUMENTS

| | | |
|---|---|---|
| JP | 10-504367 A | 4/1998 |
| JP | 2003-001439 A | 1/2003 |
| JP | 2004-298935 A | 10/2004 |
| SU | 967663 A * | 10/1982 |

* cited by examiner

| No. | | UPSET TIMING (sec) / PERIPHERAL VELOCITY IN THE OUTERMOST PERIPHERY OF THE ROTATION IN THE JOINING FACE (m/sec) | TOTAL UPSET AMOUNT (mm) | TENSILE STRENGTH (MPa) |
|---|---|---|---|---|
| EXAMPLES | 1 | 0.00 [2.18] | 2.37 | 463 |
| | 2 | | 2.53 | 455 |
| | 3 | | 2.33 | 450 |
| | 4 | 0.06 [1.56] | 2.12 | 463 |
| | 5 | | 2.29 | 452 |
| | 6 | | 2.08 | 469 |
| | 7 | 0.12 [0.91] | 1.97 | 469 |
| | 8 | | 1.98 | 447 |
| | 9 | | 1.90 | 469 |
| COMPARATIVE EXAMPLES | 10 | 0.18 [0.40] | 1.40 | * |
| | 11 | | 1.44 | 452 |
| | 12 | | 1.52 | 461 |
| | 13 | 0.24 [0.07] | 0.99 | * |
| | 14 | | 0.96 | * |
| | 15 | | 1.02 | * |
| | 16 | 0.27 [0.00] | 0.82 | * |
| | 17 | | 0.85 | * |
| | 18 | | 0.85 | * |
| (*) MARK IN THE COLUMN OF TENSILE STRENGTH (MPA) INDICATES "BROKEN WHEN REMOVING BURRS BY CUTTING". | | | | |

| | No. | UPSET TIMING (sec) PERIPHERAL VELOCITY IN THE OUTERMOST PERIPHERY OF THE ROTATION IN THE JOINING FACE (m/sec) | TOTAL UPSET AMOUNT (mm) | TENSILE STRENGTH (MPa) |
|---|---|---|---|---|
| EXAMPLES | 1 | 0.00 [4.16] | 3.93 | 452 |
| | 2 | | 3.92 | 472 |
| | 3 | | 3.93 | 465 |
| | 4 | | 3.92 | 478 |
| | 5 | 0.06 [2.99] | 3.76 | 467 |
| | 6 | | 3.57 | 476 |
| | 7 | | 3.70 | 461 |
| | 8 | | 3.77 | 475 |
| | 9 | 0.12 [1.74] | 3.52 | 456 |
| | 10 | | 3.36 | 480 |
| | 11 | | 3.48 | 470 |
| | 12 | | 3.41 | 454 |
| COMPARATIVE EXAMPLES | 13 | 0.18 [0.77] | 3.08 | 377 |
| | 14 | | 3.13 | 392 |
| | 15 | | 3.13 | 391 |
| | 16 | | 3.13 | 396 |
| | 17 | 0.24 [0.14] | 2.75 | 358 |
| | 18 | | 2.79 | 303 |
| | 19 | | 2.77 | 245 |
| | 20 | | 2.82 | 273 |
| | 21 | 0.27 [0.00] | 2.63 | 245 |
| | 22 | | 2.62 | 302 |
| | 23 | | 2.57 | 301 |
| | 24 | | 2.63 | 315 |

DISSIMILAR METAL JOINT PRODUCT AND JOINING METHOD THEREFOR

TECHNICAL FIELD

The present invention relates to a dissimilar metal joint product of a nickel-titanium alloy material with a pure titanium material, and to a joining method therefor.

BACKGROUND ART

In recent years, nickel-titanium alloy materials which are the compositions to generate shape-memory effect or superelasticity effect have been used as materials for various kinds of industrial products for utilizing their functionality. In the development of these products, however, the fact that the nickel-titanium alloy materials have poor workability constitutes a big obstacle. For this reason, dissimilar metal joint products of nickel-titanium alloy material with pure titanium material are highly evaluated in the uses as a functional material because the pure titanium material shows good workability and has functionality such as biocompatibility and corrosion resistance.

In addition, in the dissimilar metal joint products of nickel-titanium alloy material with pure titanium material, the nickel-titanium alloy material gives higher tensile strength than that of the pure titanium material. Accordingly, the joint therebetween is required to have a tensile strength equal to or higher than that of the pure titanium material before joining.

Meanwhile, regarding the method for joining a nickel-titanium alloy material and a dissimilar metal material, since the joining by an ordinary welding method is difficult, generally there are adopted methods such as a mechanical joining method including swaging, and a method of plating the nickel-titanium alloy material, followed by brazing.

The dissimilar metal joint product of a nickel-titanium alloy material with a pure titanium material joined by a conventional ordinary method has, however, a problem that the joint shows a significantly lower tensile strength than that of the pure titanium material before joining. Furthermore, the dissimilar metal joint product of a nickel-titanium alloy material with a pure titanium material joined by brazing has a problem of having a wide heat-affected zone after joining.

In this respect, there has been proposed a technology described in "Method for Brazing Superelastic Alloy" of Patent Document 1, in which a superelastic alloy is covered with a titanium coating layer by sputtering or the like, and then brazing is applied to the titanium coating using a titanium alloy brazing material. The technology can provide a dissimilar metal joint product having high strength at the joint by covering the superelastic alloy with the titanium coating layer having high adhesion strength, compared with that of the products joined by a conventional ordinary method. Since, however, the technology conducts joining by brazing, the problem of having a wide heat-affected zone after joining cannot be solved.

Further, Patent Document 2 and Patent Document 3 proposed the respective technologies of joining a nickel-titanium alloy material and a nickel-base alloy material, and Patent Document 4 proposed a technology of joining a nickel-titanium alloy material and a dissimilar metal material.

Compared with the dissimilar metal joint products prepared by a conventional ordinary method, the above-described technologies can attain dissimilar metal joint products having higher strength at the joint through the formation of a metal structure solidified in a state where a pressing force is transmitted to the melt, or through the formation of a liquid metal forging structure in a thickness of about 20 µm or less over the whole area of the joint interface. In addition, pressurizing the joining materials at high temperatures and placing a heat-releasing zone in the vicinity of the joining face make it possible to obtain a dissimilar metal joint product having a narrow heat-affected zone after joining.

These technologies, however, caused problems such that the precision required in adjusting the joining face condition and the contact condition becomes insufficient and the liquid metal forging structure becomes difficult to be formed at a thickness of about 20 µm or less over the whole area of the joining face when the joining area increases, which resulted in easily causing deterioration of the strength and easily causing variation in the strength, at the joint. Consequently, the dissimilar metal joint products of nickel-titanium alloy material and pure titanium material according to the above-described technologies failed to attain the tensile strength at the joint equal to or higher than that of the pure titanium material before joining, as reported by Examples of Patent Document 4 as not less than 20 kg/mm$^2$ and smaller than 30 kg/mm$^2$ of tensile strength at the joint.

Patent Document 1: Japanese Patent No. 1968308
Patent Document 2: Japanese Patent No. 2516447
Patent Document 3: Japanese Patent No. 2563843
Patent Document 4: Japanese Patent No. 2737817

DISCLOSURE OF THE INVENTION

Problems to be Solved by the Invention

In consideration of the above-described problems of conventional technologies, an object of the present invention is to provide a dissimilar metal joint product of a nickel-titanium alloy material and a pure titanium material, which provides a joint having a tensile strength equal to or higher than that of the pure titanium material before joining, having a small variation in strength at the joint, and having a narrow heat-affected zone after joining, and is to provide a method for joining therefor.

Means to Solve the Problems

The dissimilar metal joint product according to the present invention is a dissimilar metal joint product of a nickel-titanium alloy material and a pure titanium material, in which the joint of the nickel-titanium alloy material and the pure titanium material is composed of a structure of reaction layer which is formed by the compressive force induced by an upset force in the state of friction pressure welding and by the rotational force of decelerating rotation, and further the joint has a tensile strength equal to or higher than that of the pure titanium material before joining. In addition, the nickel-titanium alloy material has a composition which generates shape-memory effect or superelasticity effect. Furthermore, the pure titanium material has a composition equivalent to Class 1 or Class 2 defined in JIS H4650. Further, the portion of the pure titanium material is joined with a metal material different from the nickel-titanium alloy material at a joint different from the above joint, and the thickness between both joints is equal to or smaller than the outer size of the portion of the pure titanium material. In addition, the joints are shaped by processing performed after joining.

The joining method for dissimilar metal joint product according to the present invention has the step of joining a nickel-titanium alloy material and a pure titanium material, while rotating at least one of the joining faces thereof for conducting frictional pressure welding, applying a specified upset force thereto to compress thereof, after the start of deceleration of the rotation, in a period where peripheral velocity in the outermost periphery of the rotation in the joining face is not less than 0.5 m/sec. Furthermore, the condition of frictional pressure welding is set to: 2 m/sec or larger peripheral velocity in the outermost periphery of rotation in the joining face; 100 MPa or smaller frictional pressure; and 0.5 sec or longer friction time.

The joining method for dissimilar metal joint product according to the present invention has the step of joining a nickel-titanium alloy material and a pure titanium material, while rotating at least one of the joining faces thereof for conducting frictional pressure welding, applying an upset force thereto to compress thereof, after the start of deceleration of the rotation, in a period where peripheral velocity in the outermost periphery of the rotation in the joining face is not less than 1 m/sec, the upset force being set to a smaller value than the value defined by multiplying the joint cross sectional area of the joining face by the yield strength of the pure titanium material before joining. Furthermore, the condition of frictional pressure welding is set to: 4 m/sec or larger peripheral velocity in the outermost periphery of the rotation in the joining face; 100 MPa or smaller frictional pressure; and 0.5 sec or longer friction time.

Effect of the Invention

The dissimilar metal joint product according to the present invention has the joint which has a tensile strength not less than that of the pure titanium material before joining, has a small variation in strength at the joint, and has a narrow heat-affected zone after joining.

That is, the dissimilar metal joint product according to the present invention has a structure of reaction layer which is formed by the compressive force induced by an upset force and the rotational force of decelerating rotation. Thus the compound generated in the reaction layer is formed thinly over the whole joining face, and the compound is distributed over the whole zone of the joint. As a result, the joint has a tensile strength not less than that of the pure titanium material before joining, and the variation in strength at the joint becomes smaller. Since the joint has a tensile strength not less than that of the pure titanium material before joining, the joint can be shaped, after joining, by a removal processing such as cutting processing or grinding processing, as well as by a deformation processing using plastic processing.

As is clear from the fact that such strength characteristics is obtained, the joint of the dissimilar metal joint product of the present invention is composed of a structure of reaction layer different from the structure of reaction layer formed by an ordinary frictional pressure welding method which applies a simple compressive force induced by an upset force in a state where rotation completely stops, and formed by other pressure welding methods which applies simple compressive force induced by pressurization.

In addition, compared with a joint product joined by brazing which is accompanied by heat generation at portions other than the joining face, and which induces very little deformation in the heating zone under the pressurizing force, the dissimilar metal joint product of the present invention has a narrow heat-affected zone because the dissimilar metal joint product of the present invention is a joint product which is joined by the frictional pressure welding in which the joining face is directly heated by the friction heating, and the heating zone is significantly deformed by the upset force.

Furthermore, in the dissimilar metal joint product of the present invention, the pure titanium material is integrally joined with a metal material different from the nickel-titanium alloy material at a position different from the joint. Since the pure titanium material can be strongly joined with a dissimilar metal material such as titanium alloy, aluminum, copper, carbon steel, and tantalum, by an ordinary welding method, there can be obtained a dissimilar metal joint product of a nickel-titanium alloy material therewith using the pure titanium as the intermediate section. In this case, by limiting the thickness of the zone between both joints to equal or smaller than the outer size of the pure titanium material, the strength of the joint can be increased by integrally joining them together under the condition of restricting the deformation of the pure titanium material at the intermediate section by using a material having higher strength than that of the pure titanium material.

In the joining method for dissimilar metal joint product according to the present invention, it is easy to satisfy the precision required in adjusting the joining face condition and the contact condition, and defective fraction of the joining is small. Because of these advantages, the present invention can improve the design, functions, and reliability of the product joining a nickel-titanium alloy material and a dissimilar metal material.

According to the joining method for dissimilar metal joint product of the present invention, a joint having a tensile strength not less than that of pure titanium material before joining can be formed, after the start of deceleration of the rotation, by applying an upset force in a period where peripheral velocity in the outermost periphery of the rotation in the joining face is not less than 0.5 m/sec. The variation in strength can be decreased by setting up the conditions of frictional pressure welding in terms of peripheral velocity in the outermost periphery of the rotation in the joining face, frictional pressure, and friction time, so that the temperature distribution on the joining face does not become considerably uneven.

BEST MODES FOR CARRYING OUT THE INVENTION

The embodiments for carrying out the present invention will be described below in detail. Since the embodiments given in the following are preferred examples for carrying out the present invention, there are given various technological restrictions. The present invention, however, is not limited to these embodiments unless the following description clearly specifies the limiting of the scope of the present invention.

FIG. 1 illustrates a perspective view of a dissimilar metal joint product of the present invention. The example adopts a round rod 1 made from a nickel-titanium alloy material and a round rod 2 made from a pure titanium material having the same diameter as that of the round rod 1, and the round rod 1 and the round rod 2 are integrally joined together. The joint has a structure of reaction layer, as described later, formed by the compressive force induced by an upset force in a state of frictional pressure welding therebetween and the rotational force of decelerating rotation, and having a tensile strength not less than that of the pure titanium material before joining.

The reaction layer formed by the frictional pressure welding is composed of a layer in which a compound different from the composition of the nickel-titanium alloy material is generated, and a layer in which atom-diffusion happens. That type of reaction layer at the joint is formed thinly over the whole area of the joining face.

Further, the structure of pure titanium material which is recrystallized and annealed after cold working has an equi-axial α structure. Due to, however, the effect of heat and force caused by the frictional pressure welding, there formed a thin heat-affected zone where the equiaxial α structure is metamorphosed. In conventional brazing process, crystal grain coarsening takes place by the heating at not less than the α-β transformation point (880° C.) of the pure titanium material. In the heat-affected zone generated in the pure titanium material, however, the crystal grain coarsening like this does not take place, and the influence of heat by the frictional pressure welding becomes smaller.

Consequently, since the reaction layer and the heat-affected zone at the joint are formed thinly to decrease the influence on the pure titanium material, and since the compound generated in the reaction layer is formed thinly over the whole area of the joining face and is distributed over the whole zone of the joint, the tensile strength at the joint does not decrease, giving not less than the tensile strength of the pure titanium material.

The nickel-titanium alloy material can use known alloy materials with various compositions, and a preferred one has a composition that can generate shape-memory effect or superelasticity effect. Also the pure titanium material can use known materials, and a specifically preferred one is to have a composition corresponding to Class 1 or Class 2 defined in JIS H4650.

FIG. 2 illustrates a perspective view of a dissimilar metal joint product which integrally joins a further metal material different from the nickel-titanium alloy material. In the example, a round rod 3 made from a nickel-titanium alloy material is integrally joined with one end of a round rod 4 made from a pure titanium material, while at other end of the round rod 4, a round rod 5 made of a metal material different from the nickel-titanium alloy material is integrally joined therewith. All the round rods 3 to 5 are formed in the same diameter. The round rod 5 is made of a metal material such as titanium alloy, aluminum, copper, carbon steel, or tantalum, and preferably may be the one which can strongly and integrally join with a pure titanium material by an ordinary welding method.

An example of the metal material different from the nickel-titanium alloy material which is joined with an end of the pure titanium includes Ti-22V-4Al which is a β type titanium alloy material having higher strength than that of the pure titanium material. In the joining of nickel-titanium alloy material and Ti-22V-4Al, it is difficult to attain a strong joint by an ordinary welding method and by the method of the present invention. However, in the joining of pure titanium material and Ti-22V-4Al, it is easy to attain a strong joint by, for example, an ordinary frictional pressure welding method.

By thus integrally joining the dissimilar metal materials, the nickel-titanium alloy material can be integrated with various metal materials through the use of a pure titanium material as the intermediate section.

In the case of the combination of round rods, as illustrated in FIG. 2, by limiting the thickness H of the zone between both joints of the pure titanium material as the intermediate section not more than the outer diameter D as the outer size thereof, the strength of the joint can be increased in the integral joining under the condition of restricting the deformation of the pure titanium material as the intermediate section through the use of a material having higher strength than that of the pure titanium material.

Further, FIG. 3 illustrates a perspective view of a dissimilar metal joint product which is formed by integrally joining a combination of plate-shape materials through the use of three kinds of metal materials as in the case of FIG. 2. A plate-shape material 6 made from a nickel-titanium alloy material is integrally joined with one end of a plate-shape material 7 made from a pure titanium material, while at other end of the plate-shape material 7, a plate-shape material 8 made of a metal material different from the nickel-titanium alloy material is integrally joined.

In this case, by limiting the length H of the zone between both joints of the pure titanium material as the intermediate section to be not more than the plate thickness h as the outer size thereof, the strength of the joint can be increased by integrally joining under the condition of restricting the deformation of the pure titanium material as the intermediate section through the use of a material having higher strength than that of the pure titanium material. The plate thickness h of the pure titanium material as the intermediate section may be set to be not more than the plate width W thereof.

Although in FIG. 1 and FIG. 2, round rods are integrally joined together, there can be a combination of plate-shape material with plate-shape material, or tubular material with tubular material. In these cases, for example, round rods having different diameters from each other may be used, and the shape of the joint may not coincide with each other. Furthermore, dissimilar shapes can be joined together, and for example a rod-shape material with a plate-shape material or a tubular material with a plate-shape material can be included. Thus, integral joining can be done by combination of various shapes each other.

When the joint of a dissimilar metal joint product has a non-circular cross-sectional shape, the joint can be changed in the cross sectional shape thereof from a circular cross section to a non-circular cross section having a large ratio of major axis to minor axis by utilizing the shaping workability of the removal processing such as cutting processing or grinding processing after integrally joining materials having circular cross-sectional shapes there each, or of the deformation processing by plastic processing. Since the frictional pressure welding in non-circular cross section having large ratio of major axis to minor axis thereof gives a wide zone of exposing the joining face to external atmosphere during rotational joining, it is difficult to attain good joining. In that case, it is preferable to shape the joint product by processing after joining.

FIG. 4 is a schematic drawing of a frictional pressure welding apparatus for manufacturing the dissimilar metal joint product of the present invention. To a support 11 erected and fixed to a base 10, a linear slide guide 12 is attached. A screw rod 13 positioned in parallel with the slide guide 12 is axially supported rotatably to the base 10. A screw rod 13 is rotatably driven by a drive motor 14 fixed to the support 11. A carriage 15 is screw-threaded to the screw rod 13. The carriage 15 moves upward/downward by the rotation of the screw rod 13.

An attaching frame 16 is fixed to the carriage 15, and the attaching frame 16 is equipped with a rotary motor 17. To the driving shaft of the rotary motor 17, a fixture at the rotary side 18 is mounted. To the base 10, a fixture at the fixing side 19 is positioned and fixed facing the fixture at the rotary side 18.

To the fixture at the rotary side 18, a metal material at the rotary side W1 is attached and fixed. To the fixture at the fixing side 19, a metal material at the fixing side W2 is attached and fixed. By rotating the drive motor 14 to move the carriage 15 downward, the joining face of the metal material at the rotary side W1 is tightly adhered to the joining face of the metal material at the fixing side W2. In order to avoid significant non-uniformity in the contact condition, the joining face of the metal material is preferably smoothened in advance by lathe processing or the like.

When the drive motor 14 is further rotated, the thrust applied to the joining face of the metal material W1 and the metal material W2 can be controlled. By rotating the metal material at the rotary side W1 through the rotational control of the rotary motor 17 in a state where the joining faces is pressure-welded, the joining faces of both metal materials can be frictionally pressure-welded.

The apparatus for frictional pressure welding may be an arbitrary one other than the above apparatus if only the apparatus can control the relative movement and stopping motion of the materials to be integrally joined, and thus control the frictional pressure welding. For example, the apparatus may be the one which rotates the materials to the opposite direction each other to generate a relative movement.

FIG. 5 is a graph showing the time history of the pressure (P: given by the solid line) applied to the joining face and the burn-off length (M: given by the broken line) during the frictional pressure welding. According to the example, the rotation of the rotary motor 17 begins deceleration at a time t1. Until the deceleration begins, the friction burn-off length increases owing to a certain frictional pressure P1 caused by the thrust of the drive motor 14 against the joining face and owing to a certain rotational speed of the rotary motor 17, and then the friction burn-off length M1 is attained at the time t1.

After the start of deceleration of the rotary motor 17 at the time t1, a certain upset force (P2) is applied to the joining face by increasing the thrust of the drive motor 14 in a period where peripheral velocity in the outermost periphery of the rotation in the joining face is not less than 0.5 m/sec, and the upset force (P2) is continuously applied to obtain an upset burn-off length (M2) until the rotary motor 17 stops to completely cool the joint, as described below.

FIG. 6 is a schematic drawing regarding the state where the metal materials W1 and W2, formed in round rod shape having the same diameters, are joined. FIG. 7 is a schematic drawing regarding the state where the metal materials W1 and W2, formed in round rod shape having different diameters from each other, are joined. In these cases, the joining cross sectional area S on the joining face is a cross sectional area on a plane orthogonal to the direction of force applied to the joining face at the time of the frictional pressure welding. In FIG. 6 and FIG. 7, if the outer diameters of the respective metal materials W are equal with each other, the same joining cross sectional area is attained. The actual joining face after the frictional pressure welding becomes smoothly curved under the influence of peripheral velocity.

Furthermore, the peripheral velocity in the outermost periphery of the rotation in the joining face is that in the outermost periphery in the case where the locus of the joining face generated by rotation is continuously drawn. In FIG. 6, when either one of the metal materials is rotated, the peripheral velocity in the outermost periphery of the rotation in the joining face becomes equal independent of the rotating rod. In FIG. 7, when the round rod having smaller outer diameter is rotated, the peripheral velocity in the outermost periphery of the metal material having smaller outer diameter and the peripheral velocity in the outermost periphery of the rotation in the joining face coincide with each other. When, however, the round rod having larger outer diameter is rotated, the peripheral velocity in the outermost periphery of the metal material having larger outer diameter and the peripheral velocity in the outermost periphery of the rotation in the joining face do not coincide with each other. When both the metal materials are rotated in the opposite direction from each other to attain a relative movement, the peripheral velocity in the outermost periphery of the rotation in the joining face becomes the sum of each of the peripheral velocity in the outermost periphery in the joining face of the metal material in rotation.

Control of the frictional pressure welding may be done by changing the control method depending on: setting the upset force applied after the start of deceleration to not less than the value obtained by multiplying the joint cross sectional area by the yield strength of the pure titanium material before joining; or setting the upset force smaller than thereof. The applied upset force is preferably as large as possible within the range where the pure titanium material does not deform at a portion other than the frictional pressure welded portion.

In addition, since burrs generated by the frictional pressure welding are likely to induce stress intensification thereto in terms of shapes, and since the reaction layer separated by deformation remains without being discharged outside the joining face, and thus defects are likely to be caused, these burrs are preferably removed by cutting or grinding.

EXAMPLES

Example 1

There were applied a round rod (2.1 mm in diameter, 55 mm in length) of nickel-titanium alloy material having a composition providing the superelasticity effect, and a round rod (4 mm in diameter, 59 mm in length) of pure titanium material corresponding to the composition of Class 2 defined in JIS H4650. The joining faces of the respective round rods were smoothened by lathe processing so as to tightly adhere with each other. The nickel-titanium alloy material before joining was the one treated by centerless polishing, followed by annealing. The pure titanium material before joining, treated by centerless polishing, had about 240 MPa of yield strength and about 450 MPa of tensile strength.

The above round rods were mounted on a frictional pressure welding apparatus (manufactured by Nitto Seiki Co., Ltd.) The condition of frictional pressure welding was set to: 2.18 m/sec of peripheral velocity in the outermost periphery of the rotation in the joining face, 58 MPa of the frictional pressure, 1 second of the friction time, and 361 MPa of the upset pressure. The upset force was set to not less than the value defined by multiplying the joint cross sectional area of the joining face by the yield strength of the pure titanium material before joining.

The frictional pressure welding test was conducted setting the upset timing to: 0.00 sec, 0.06 sec, 0.12 sec, 0.18 sec, 0.24 sec, and 0.27 sec, respectively. The term "upset timing" referred to herein signifies the period from after the start of deceleration of the rotation to the time of applying the upset force. FIG. 8 is a graph showing the deceleration process in the rotation in Example 1. The vertical axis indicates the peripheral velocity in the outermost periphery of the rotation in the joining face, and the horizontal axis indicates the upset timing.

After removing burrs by cutting processing, the metal joint product formed by integral joining by the frictional pressure welding was mounted on a tensile tester (manufactured by Instron Corporation), where both ends of the metal joint product were clamped so as the joint to be placed in the center of the clamped product length. The tensile test was conducted under a condition of 40 mm of the clamping distance, and 0.01 mm/sec of the cross-head speed. FIG. 9 shows the measurement result of total upset amount and of tensile strength for the metal joint product at each upset timing. The term "total upset amount" referred to herein signifies the sum of the friction burn-off length and the upset burn-off length.

As is clear from the measurement result of FIG. 9 clearly shows, Example 1 confirmed that, at 0.5 m/sec or larger peripheral velocity in the outermost periphery of the rotation in the joining face, the joint has a tensile strength not less than that of the pure titanium material before joining, and shows a smaller variation in the strength at the joint.

Further, when the cross sectional structure at the joint was examined, there observed a layer in which a compound different from the composition of the nickel-titanium alloy material was generated, and a layer in which atom-diffusion was caused. Such reaction layer at the joint was formed thinly at a thickness of 50 μm or smaller over the whole area of the joining face. The layer of the generated compound was formed thinly at a thickness of about 20 μm or less over the whole area of the joining face.

In addition, the structure of the pure titanium material was an equiaxial α structure having about 50 μm of crystal grain size. The heat-affected zone which was changed from the original equiaxial α structure by the effect of heat and force of the frictional pressure welding was formed thinly at a thickness of 500 μm or smaller. In the heat-affected zone, there was observed no crystal grain coarsening, which crystal grain coarsening was found in the brazing of pure titanium material heated to not less than the α-β transformation point (880° C.) thereof. From such observation results, it is understood that the influence of heat of the frictional pressure welding is small.

Additionally, according to Comparative Examples in which an upset force was applied, after the start of deceleration of the rotation, at the time when the peripheral velocity in the outermost periphery of the rotation in the joining face became smaller than 0.5 m/sec, it was confirmed that the joint did not have a tensile strength not less than that of the pure titanium material before joining, and that the variation in strength at the joint was large.

Example 2

Frictional pressure welding test for a nickel-titanium alloy material and a pure titanium material was conducted by using a round rod (4 mm in diameter, 63 mm in length) of nickel-titanium alloy material having a composition generating the superelasticity effect, and a round rod (4 mm in diameter, 63 mm in length) of pure titanium material corresponding to the composition of Class 2 defined in JIS H4650. The joining faces of the respective round rods were smoothened by lathe processing so as to tightly adhere with each other. The nickel-titanium alloy material before joining, treated by centerless polishing, was annealed. The pure titanium material before joining, treated by centerless polishing, had about 240 MPa of yield strength and about 450 MPa of tensile strength.

With a frictional pressure welding apparatus in the same way as in Example 1, the condition of frictional pressure welding was set to: 4.16 m/sec of peripheral velocity in the outermost periphery of the rotation in the joining face, 46 MPa of the frictional pressure, 1 second of the friction time, and 239 MPa of the upset pressure. The upset force was set to smaller than the value defined by multiplying the joint cross sectional area of the joining face by the yield strength of the pure titanium material before joining.

And the frictional pressure welding test was conducted setting the upset timing to: 0.00 sec, 0.06 sec, 0.12 sec, 0.18 sec, 0.24 sec, and 0.27 sec, respectively. FIG. 10 is a graph showing the deceleration process in the rotation in Example 2. The vertical axis indicates the peripheral velocity in the outermost periphery of the rotation in the joining face, and the horizontal axis indicates the upset timing.

The integrally joined metal joint product by the frictional pressure welding was then subjected to tensile test in the same way as Example 1. The measurement results of the total upset amount and the tensile strength for the metal joint product at each upset timing are shown in FIG. 11.

As is clear from the measurement results in FIG. 11, in Example 2, it was confirmed that, at 1 m/sec or larger peripheral velocity in the outermost periphery of the rotation in the joining face, the joint has a tensile strength not less than that of the pure titanium material before joining, and there is a small variation in the strength at the joint.

Further, when the cross sectional structure at the joint was examined, there observed, in the same way as Example 1, a reaction layer composed of a layer in which a compound different from the composition of the nickel-titanium alloy material was generated, and a layer in which atom-diffusion was caused. The reaction layer was formed thinly at a thickness of 50 μm or smaller over the whole area of the joining face. The layer of the compound generated was formed thinly at a thickness of about 20 μm or less over the whole area of the joining face.

In addition, in the same way as Example 1, a heat-affected zone in the pure titanium material was induced, and the heat-affected zone was formed thinly at a thickness of 500 μm or smaller. In the heat-affected zone, there was observed no crystal grain coarsening, which grain coarsening was found in the brazing of pure titanium material heated to no less than the α-β transformation point (880° C.) thereof, which showed that the influence of heat of the friction pressure welding was small.

Furthermore, according to Comparative Examples in which an upset force was applied, after the start of deceleration of the rotation, at the time when the peripheral velocity in the outermost periphery of the rotation in the joining face became smaller than 1 m/sec, the joint does not have a tensile strength not less than that of the pure titanium material before joining, and the variation in strength at the joint is large.

INDUSTRIAL APPLICABILITY

The dissimilar metal joint product according to the present invention can be used in various applications including household electric appliances, household equipment, transportation equipment, eyeglasses, and medical devices, and provides great possibility of industrial applicability.

DESCRIPTION OF THE REFERENCE SYMBOLS

Figure 1:
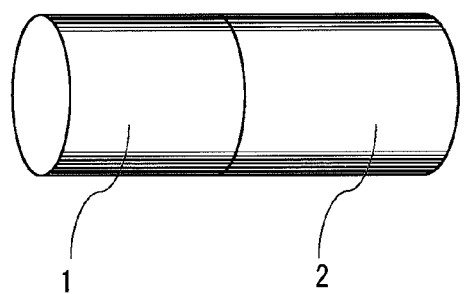
FIG. 1 illustrates a perspective view of a dissimilar metal joint product which is formed by integrally joining two round rods each other.
Figure 2:
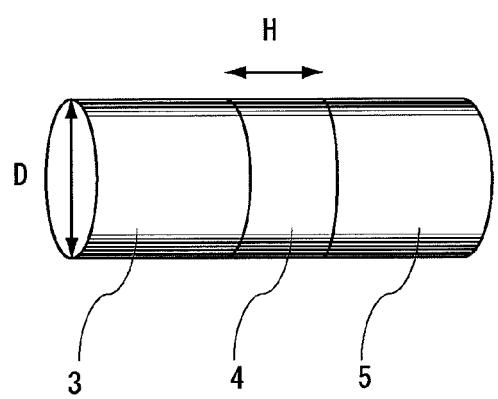
FIG. 2 illustrates a perspective view of a dissimilar metal joint product which is formed by integrally joining three round rods together.
Figure 3:
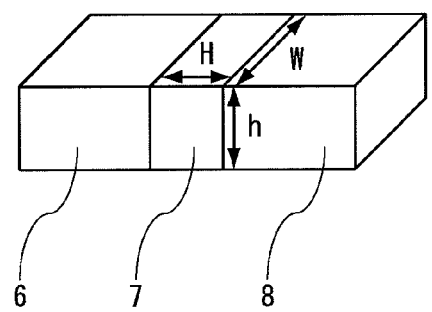
FIG. 3 illustrates a perspective view of a dissimilar metal joint product which is formed by integrally joining three plate-shape materials together.
Figure 4:
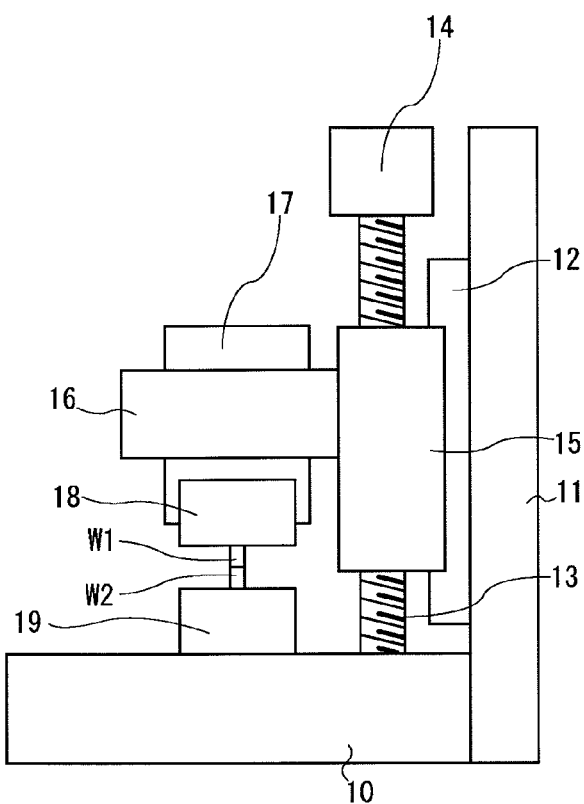
FIG. 4 is a schematic drawing of frictional pressure welding apparatus.
Figure 5:
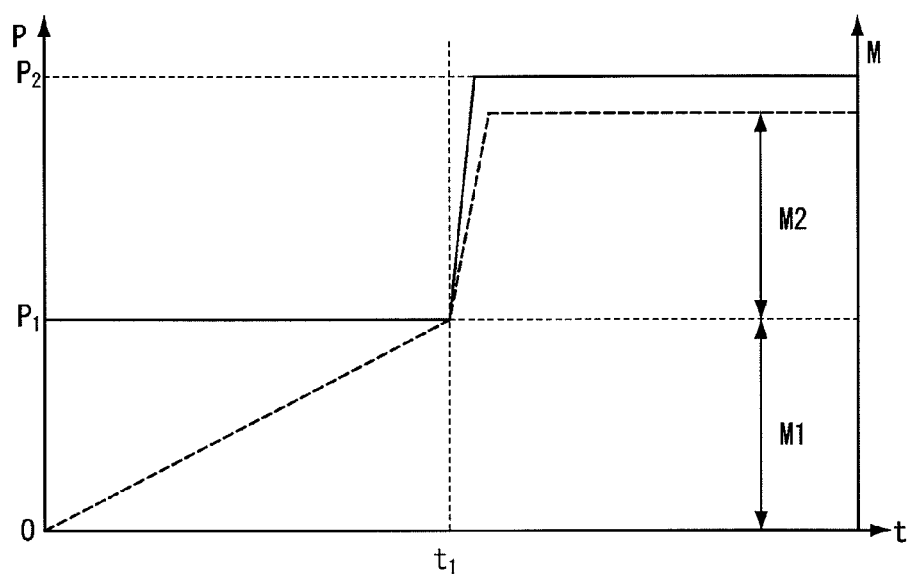
FIG. 5 is a graph showing the time history of the operation of frictional pressure welding.
Figure 6:
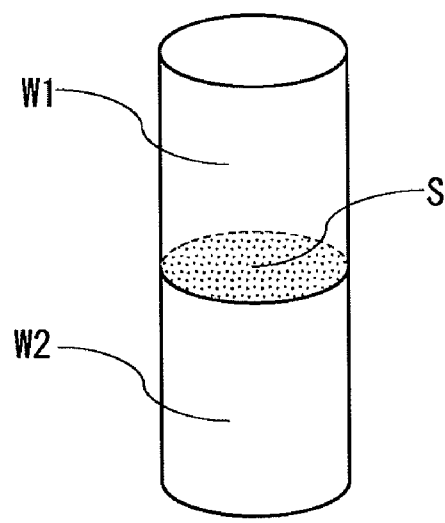
FIG. 6 is a schematic drawing of joining face for frictional pressure welding of two round rods, having the same diameter as each other.
Figure 7:
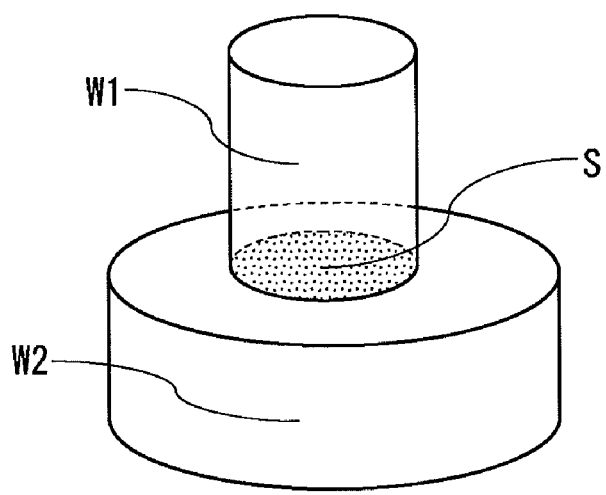
FIG. 7 is a schematic drawing of joining face for frictional pressure welding of two round rods, having different diameter from each other.
Figures 8, 9:
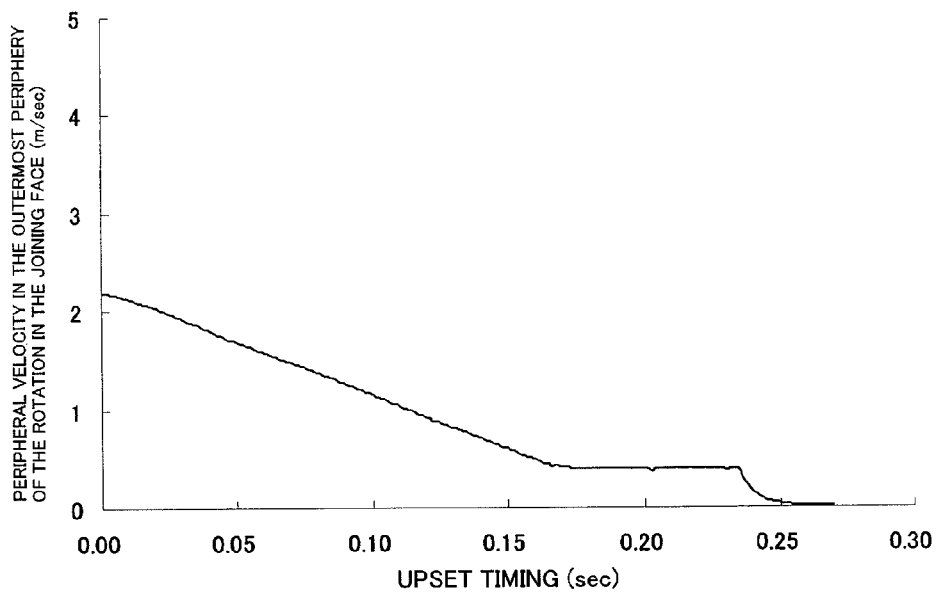
FIG. 8 is a graph showing the deceleration process of the rotation in Example 1.
FIG. 9 shows the measurement result of Example 1.
Figures 10, 11:
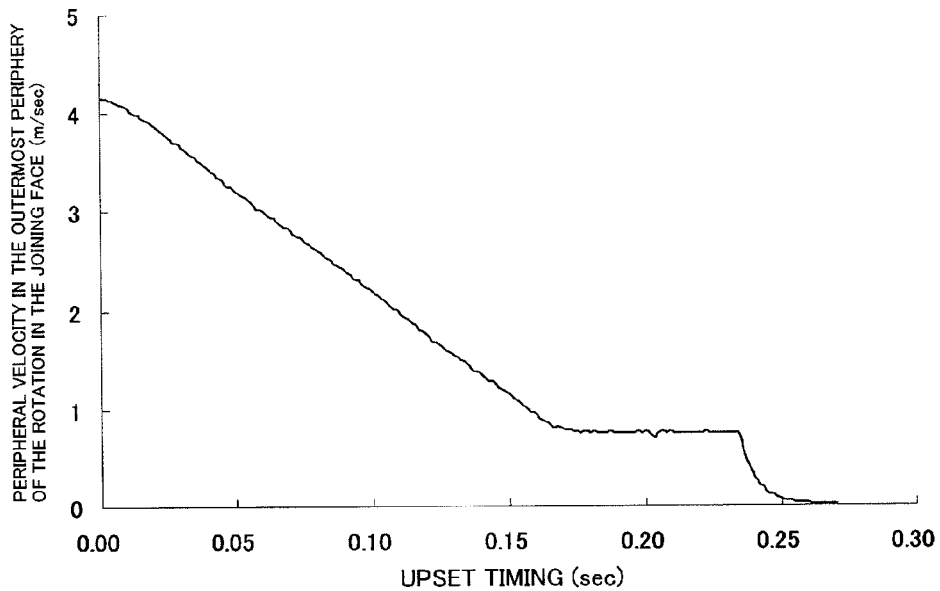
FIG. 10 is a graph showing the deceleration process of the rotation in Example 2.
FIG. 11 shows the measurement result of Example 2.

W1 Metal material at the rotary side
W2 Metal material at the fixing side
1 Round rod made from nickel-titanium alloy material
2 Round rod made from pure titanium material
3 Round rod made from nickel-titanium alloy material
4 Round rod made from pure titanium material
5 Round rod made from dissimilar metal materials
6 Plate-shape material made from nickel-titanium alloy material
7 Plate-shape material made from pure titanium material
8 Plate-shape material made from dissimilar metal materials
10 Base
11 Support
12 Slide guide
13 Screw rod
14 Drive motor
15 Carriage
16 Attaching frame
17 Rotary motor
18 Fixture at the rotary side
19 Fixture at the fixing side

The invention claimed is:

1. A dissimilar metal joint product being prepared by joining a nickel-titanium alloy material and a pure titanium material to integrate them together, a joint between the nickel-titanium alloy material and the pure titanium material being composed of a structure of a reaction layer which is formed by both a compressive force induced by an upset force in a state of frictional pressure welding therebetween and a rotational force of decelerating rotation and having a tensile force not less than that of the pure titanium material before the joining.

2. The dissimilar metal joint product according to claim 1, wherein the nickel-titanium alloy material has a composition which generates shape-memory effect or superelasticity effect.

3. The dissimilar metal joint product according to claim 1, wherein the pure titanium material has a composition corresponding to Class 1 or Class 2 defined in JIS H4650.

4. The dissimilar metal joint product according to claim 1, wherein the pure titanium material is integrally joined with a metal material different from the nickel-titanium alloy material at a position different from the joint, and the thickness between both joints is not more than the outer size of the pure titanium material.

5. The dissimilar metal joint product according to claim 1, wherein the joint is shaped by processing performed after the joining.

6. A joining method for dissimilar metal joint product, comprising the step of joining a nickel-titanium alloy material and a pure titanium material, while rotating at least one of the joining faces thereof for conducting frictional pressure welding, applying a specified upset force thereto to compress thereof, after the start of deceleration of the rotation, in a period where peripheral velocity in an outermost periphery of the rotation in the joining face is not less than 0.5 msec.

7. The joining method for dissimilar metal joint product according to claim 6, wherein the condition of frictional pressure welding is: 2 msec or larger peripheral velocity in the outermost periphery of the rotation in the joining face; 100 MPa or smaller frictional pressure; and 0.5 sec or longer friction time.

8. A joining method for dissimilar metal joint product, comprising the step of joining a nickel-titanium alloy material and a pure titanium material, while rotating at least one of the joining faces thereof for conducting frictional pressure welding, applying a specified upset force thereto to compress thereof, after the start of deceleration of the rotation, in a period where peripheral velocity in an outermost periphery of the rotation in the joining face is not less than 1 msec, the upset force being set to a smaller value than the value defined by multiplying the joint cross sectional area of the joint face by the yield strength of the pure titanium material before the joining.

9. The joining method for dissimilar metal joint product according to claim 8, wherein the condition of frictional pressure welding is: 4 msec or larger peripheral velocity in the outermost periphery of the rotation in the joining face; 100 MPa or smaller frictional pressure; and 0.5 sec or longer friction time.

10. The dissimilar metal joint product according to claim 2, wherein the pure titanium material has a composition corresponding to Class 1 or Class 2 defined in JIS H4650.

11. The dissimilar metal joint product according to claim 2, wherein the pure titanium material is integrally joined with a metal material different from the nickel-titanium alloy material at a position different from the joint, and the thickness between both joints is not more than the outer size of the pure titanium material.

12. The dissimilar metal joint product according to claim 2, wherein the joint is shaped by processing performed after the joining.

\* \* \* \* \*